US011019457B2

(12) United States Patent
Lee et al.

(10) Patent No.: US 11,019,457 B2
(45) Date of Patent: May 25, 2021

(54) METHOD FOR REDUCING WIRELESS POSITIONING ERROR IN MULTI-NODE SYSTEM AND TERMINAL THEREFOR

(71) Applicant: LG Electronics Inc., Seoul (KR)

(72) Inventors: Woonghee Lee, Seoul (KR); Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/650,172

(22) PCT Filed: Sep. 28, 2018

(86) PCT No.: PCT/KR2018/011527
§ 371 (c)(1),
(2) Date: Mar. 24, 2020

(87) PCT Pub. No.: WO2019/066554
PCT Pub. Date: Apr. 4, 2019

(65) Prior Publication Data
US 2020/0236505 A1 Jul. 23, 2020

Related U.S. Application Data

(60) Provisional application No. 62/564,272, filed on Sep. 28, 2017.

(51) Int. Cl.
*H04W 4/029* (2018.01)
*G01S 13/08* (2006.01)
*H04W 28/04* (2009.01)

(52) U.S. Cl.
CPC ............ *H04W 4/029* (2018.02); *G01S 13/08* (2013.01); *H04W 28/04* (2013.01)

(58) Field of Classification Search
None
See application file for complete search history.

(56) References Cited

U.S. PATENT DOCUMENTS

2005/0228613 A1* 10/2005 Fullerton .............. G01S 5/0289
342/458
2010/0248637 A1* 9/2010 Sahinoglu ............ H04W 64/00
455/67.11
(Continued)

FOREIGN PATENT DOCUMENTS

KR    10-2008-0098181 A    11/2008
KR    10-2009-0083105 A    8/2009
(Continued)

OTHER PUBLICATIONS

N. Levanon, Lowest GDOP in 2-D scenarios, IEE Proc.—Radar Sonar Navig., vol. 147, No. 3, Jun. 2000 (Year: 2000).*
(Continued)

*Primary Examiner* — German Viana Di Prisco
(74) *Attorney, Agent, or Firm* — Dentons US LLP

(57) ABSTRACT

The present invention provides a method for reducing a wireless positioning error by a target node in a multi-node system. Specifically, the method comprises the steps of: receiving information on the positions of anchor nodes from the anchor nodes, respectively; performing ranging of each of the anchor nodes; and when the target node is in a first state, transmitting information on the position of the target node to neighboring nodes except for each of the anchor nodes. The target node is capable of communicating with at least one of another target node, a target node related to an autonomous driving vehicle, a base station or a network.

17 Claims, 8 Drawing Sheets

(56) References Cited

U.S. PATENT DOCUMENTS

| | | | | |
|---|---|---|---|---|
| 2011/0188389 A1* | 8/2011 | Hedley | ............... | G01S 5/0215 |
| | | | | 370/252 |
| 2013/0023286 A1* | 1/2013 | Soma | ............... | H04W 64/00 |
| | | | | 455/456.1 |
| 2013/0194942 A1* | 8/2013 | Hu | ............... | H04W 24/02 |
| | | | | 370/252 |
| 2018/0267137 A1* | 9/2018 | Igura | ............... | G01S 5/0289 |
| 2018/0332430 A1* | 11/2018 | Kumar | ............... | G01S 5/0263 |
| 2019/0239181 A1* | 8/2019 | Gangakhedkar | ...... | H04W 76/40 |
| 2020/0228924 A1* | 7/2020 | Lelkens | ............... | G01S 5/0284 |

FOREIGN PATENT DOCUMENTS

| | | |
|---|---|---|
| KR | 10-2010-0047989 A | 5/2010 |
| KR | 10-1234177 B1 | 2/2013 |
| WO | 2016/200137 A1 | 12/2016 |

OTHER PUBLICATIONS

V.B.S.Srilatha Indira Dutt et al, Investigation of GDOP for Precise user Position Computation with all Satellites in view and Optimum four Satellite Configurations, J. Ind. Geophys. Union, vol. 13, No. 3, pp. 139-148, Jul. 2009 (Year: 2009).*

* cited by examiner

METHOD FOR REDUCING WIRELESS POSITIONING ERROR IN MULTI-NODE SYSTEM AND TERMINAL THEREFOR

This application is a National Stage Entry of International Application No. PCT/KR2018/011527 filed Sep. 28, 2018, which claims the benefit of U.S. Provisional Application No. 62/564,272 filed Sep. 28, 2017, all of which are hereby incorporated by reference in their entirety for all purposes as if fully set forth herein.

TECHNICAL FIELD

The present disclosure relates to a method of reducing a wireless positioning error in a multimode system, and a user equipment (UE) therefor. More specifically, the present disclosure relates to a temporal anchor node determination method based on geometric dilution of precision (GDoP) for reducing a wireless positioning error of a target node, and a control method according thereto.

BACKGROUND ART

As more and more communication devices require greater communication capacity, there is a need for mobile broadband communication enhanced over conventional Radio Access Technology (RAT). In addition, massive Machine Type Communications (MTC) capable of providing a variety of services anywhere and anytime by connecting multiple devices and objects is one of important issues to be considered in the next-generation communications.

Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

Meanwhile, an anchor node (e.g., an evolved node B (eNB)) detects and possesses geometric dilution of precision (GDoP) for neighboring anchor nodes centering thereon. For example, distribution of GDoP values for respective node positions during positioning through time information based ranging in an LTE system is illustrated in FIG. 1.

Performing ranging may be understood as meaning that a node that desires to be aware of the position thereof measures the distance to a node that is aware of the position thereof. Positioning may be understood as estimating an accurate position of a node based on ranging. Positioning, which will be described later, may be categorized into UE-assisted positioning or UE-based positioning depending on whether a UE performs positioning by itself.

GDoP means a positioning error or a ranging error. FIG. 1 illustrates GDoP values according to target node positions when there are 3 eNBs and there are 5 NBs in an LTE positioning protocol (LPP). It may be appreciated that a GDoP value is small as a target node is positioned at the center in the two cases.

The reason why the GDoP values differ according to measurement geometry may be explained by the concept of ranging uncertainty. Generally, wireless positioning requires ranging information between an anchor node that has already been aware of the position thereof and a target node that desires to be aware of the position thereof. Candidate positions may be present in the form of a circle based on the distance between the anchor node and the target node and a position is estimated based on intersection points or regions of the candidate positions.

In this case, drawing a circle of a solid line based on realized ranging information contains philosophy indicating that 'a corresponding target node is aware that a corresponding target node is present on this circle (candidate position)'. However, since a sampling rate may not be increased near to infinity, the candidate position (solid line representing the circle) may be expressed as a region rather than the line, as illustrated in FIG. 2.

Accordingly, in an actual communication system, when time-based ranging is performed, ranging may be inevitably represented only as a multiple of an integer of ranging resolution of (speed of light/sampling rate). That is, if it is assumed that the ranging resolution is 10 m, an actual range of 6 m is estimated as a ranging value of 10 m and an actual range of 13 m is estimated as a ranging value of 20 m. Therefore, an actual target node is present on a region with a thickness of (speed of light/sampling rate) rather than a circle of a solid line.

That is, even if a line of sight (LoS) component is present and a sufficient signal-to-noise (SNR) is secured so that a propagation delay of a first path of a channel is discovered, since this value has already been quantized based on the sampling rate, there is uncertainty and such uncertainty is called ranging uncertainty.

Intersections of regions meant by such ranging uncertainty may be called positioning uncertainty. Even when ranging uncertainty is equal, the intersections may be present in significantly various forms. A method of reducing ranging uncertainty which may be inevitably present in an actual situation, i.e., a wireless positioning error of multiple nodes, is needed.

DETAILED DESCRIPTION OF THE DISCLOSURE

Technical Problems

An object of the present disclosure is to provide a temporal anchor node selection method based on geometric dilution of precision (GDoP) for reducing a wireless positioning error of multiple nodes.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

To achieve the above object, a method of reducing a wireless positioning error by a target node includes receiving information about a position of an anchor node from each of anchor nodes, performing ranging for the anchor nodes, and transmitting information about a position of the target node to neighboring nodes except for the anchor nodes, based on a first state of the target node. In the first state, a region in which ranging regions for the anchor nodes commonly overlap may be present.

A state of the target node may be determined based on the ranging, resolution information of the ranging, and information about the position of the anchor node.

The information about the measured position of the target node may be transmitted based on a predetermined condition being satisfied. The predetermined condition may be satisfied when a value measured based on (i) the number of messages received from the neighboring nodes and (ii) an area of the region in which the ranging regions commonly overlap exceeds a preset threshold.

The resolution information of the ranging may be information about a width of the ranging regions of the anchor nodes.

The method of reducing the wireless positioning error may further include, based on a second state of the target node, transmitting a message indicating that the target node is the second state to the neighboring nodes except for the anchor nodes. In the second state, the region in which the ranging regions for the anchor nodes commonly overlap may not be present.

In an inband sidelink environment, the transmitting the message to the neighboring nodes except for the anchor nodes may further include transmitting the message indicating that the target node is the second state and an identification (ID) of the target node to a base station (BS), and transmitting the message to the neighboring nodes except for the anchor nodes based on an idle resource scheduled by the BS.

In an outband sidelink environment, the transmitting the message to the neighboring nodes except for the anchor nodes may further include transmitting the message and an identification (ID) of the target node to the neighboring nodes except for the anchor nodes based on a resource selected from a sidelink resource pool.

The method of reducing the wireless positioning error by the target node may further include receiving information about positions of neighboring temporal anchor nodes from the temporal anchor nodes.

The method of reducing the wireless positioning error by the target node may further include performing additional ranging for each of the temporal anchor nodes, and correcting a positioning error of the target node based on the additional ranging.

To achieve another object, a target node for performing a method of reducing a wireless positioning error in a multi-node system includes a radio frequency (RF) unit configured to receive information about a position of an anchor node from each of anchor nodes; and a processor, wherein the processor performs ranging for the anchor nodes, measures a position of the target node based on a first state of the target node, and transmits information about the measured position of the target node to neighboring nodes except for the anchor nodes.

In the first state, a region in which ranging regions for the anchor nodes commonly overlap may be present.

Advantageous Effects

According to an aspect of the present disclosure, a method of reducing a wireless positioning error by a target node may reduce a network-level positioning error as compared with a positioning scheme between multiple anchor nodes and the target node through time-based ranging in a physical environment in which a high SNR is not secured and an LoS is not guaranteed.

A temporal anchor node selection method according to an embodiment of the present disclosure selects a link between target nodes based on a full-intersection state. Therefore, the present disclosure may provide a less complicated signaling flow than a conventional distributed positioning algorithm in which all target nodes sequentially trigger ranging and positioning. Further, the present disclosure considers positioning accuracy reliability so that better performance may be obtained in terms of error propagation.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the disclosure and are incorporated in and constitute a part of this specification, illustrate embodiments of the disclosure.

BEST MODE FOR CARRYING OUT THE DISCLOSURE

Figure 1:
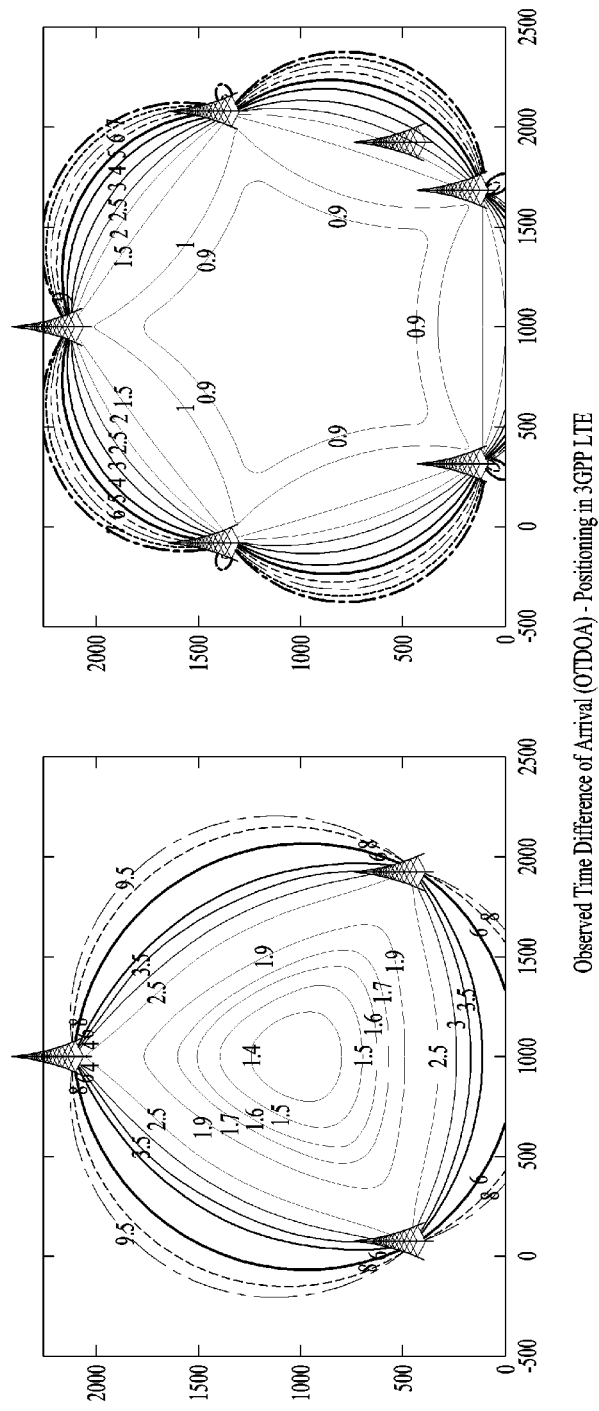
FIG. 1 is a diagram illustrating distribution of GDoP values for respective target node positions during positioning through time information based ranging in an LTE system
Figure 2:
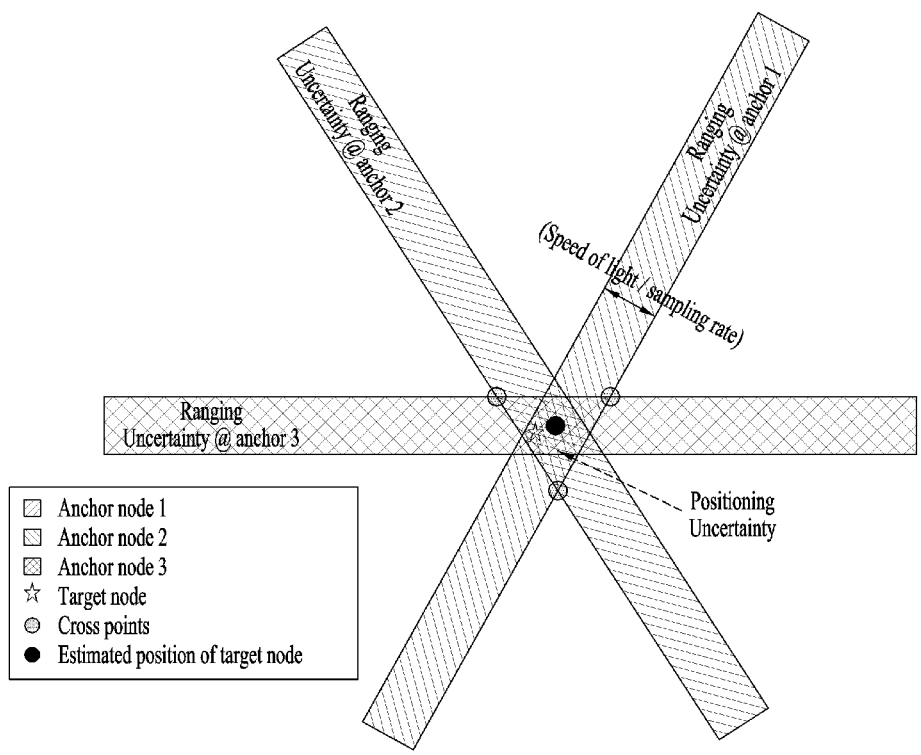
FIG. 2 is a diagram illustrating ranging measurement between a target node and anchor nodes.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

Scenario (LPPe Based NR Sidelink-Assisted Positioning)

Referring to LPP Extensions Specification Version 1.1, in LTE positioning protocol enhanced (LPPe), a cell location is supposed to be transmitted to a UE through LPPe observed time difference of arrival (OTDOA) reference/neighbor assistance information.

More specifically, a general LTE positioning protocol (LPP) adopts UE-assisted positioning so that the UE is concerned only with ranging and a location server processes positioning. In contrast, LPPe adopts UE-based positioning so that the UE receives an actual position of an anchor node such as an eNB and performs positioning by itself.

Hereinafter, embodiments of the present disclosure will be described based on a scenario of LPPe. However, the present disclosure is not limitedly interpreted by LPPe and is applicable to a scenario of LPP.

Definition of Terminology

In regard to embodiments of the present disclosure, terminology to be used hereinbelow will first be defined.

N denotes the number of anchor nodes. M denotes the number of target nodes. $X\_i$ ($=[x\_j, y\_i]$) denotes an actual position of an i-th node, wherein if $i \in \{1, \ldots, N\}$, then $X\_i$ denotes an actual position of an anchor node and, if $i \in \{N+1, \ldots, N+M\}$, then $X\_i$ denotes an actual position of a target node. $hat\_X\_i(=[hat\_x\_i, hat\_y\_i])$ denotes an estimation position of an i-th node. $D\_ij$ denotes the distance between node i and node j. $hat\_D\_ij$ denotes an estimation value of $D\_ij$.

A target node measures a ranging value with an anchor node that is aware of the position thereof. $D\_resol$ denotes ranging resolution, i.e., the width of a ranging uncertainty region. In an LTE positioning protocol (LPP) for example, $D\_resol$ is 9.8 m (3*10^8 [speed of light]/(15000 [subcarrier spacing] *2048 [FFT size])).

$\Delta\_ij$ denotes a ranging error between node i and node j when an LoS component is present and an SNR is sufficiently secured as a large value so that a sampling error for propagation delay estimation of a first path is 0 (this environment is referred to as an ideal link for convenience of representation) and is uniformly distributed on [0, $D\_resol$].

$\varepsilon\_ij$ denotes a ranging error between node i and node j and may be defined as $\varepsilon\_ij=k*D\_resol+\Delta\_ij$. Here, k is discretely determined probabilistically due to an SNR or an LoS probability of a corresponding environment and is a realization value of the integer domain. That is, in the ideal link, k=0 and $0 \leq \varepsilon\_ij=\Delta\_ij<D\_resol$, so that k is bounded by $D\_resol$ which is systematically determined.

Lastly, $\varepsilon\_i$ denotes a positioning error of node i.

Assumptions (Characteristics of Anchor Node and Target Node):

In regard to embodiments of the present disclosure, the following three assumptions will now be described.

First, anchor nodes are aware of absolute positions $X\_i$ thereof. Second, target nodes are not aware of absolute positions $X\_i$ thereof. Third, target nodes are aware of absolute positions $\{X\_1, \ldots, X\_N\}$ of anchor nodes. Target nodes within transmission coverage may exchange estimation positions $hat\_X\_j$ thereof and estimation distances $hat\_D\_ij$ therebetween.

The right scope of the present disclosure is not determined by the claims and is not limitedly interpreted by the above-described assumptions.

Proposal 1 (Definition of Full-Intersection)

Figure 3:
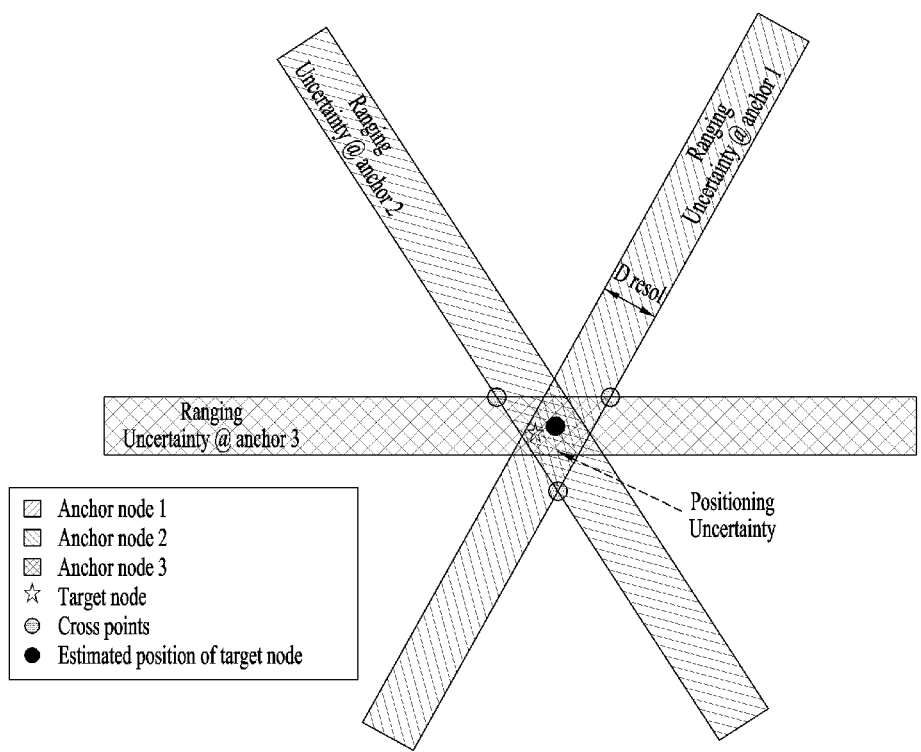
FIG. 3 is a diagram illustrating securement of ideal links with all anchor nodes according to an aspect of the present disclosure.

FIG. 3 is a diagram illustrating securement of ideal links with all anchor nodes. In contrast, in FIG. 4, a sampling error occurs between anchor node 1 and a target node because a sufficient SNR is not secured or an LoS component is lost due to blocking by an obstacle etc., thereby causing longer ranging by 4*$D\_resol$ as compared with ranging in FIG. 3.

Referring to FIG. 3, it may be confirmed that there is an intersection at which all ranging uncertainty regions overlap. For convenience, this intersection is referred to as a full-intersection.

Figure 4:
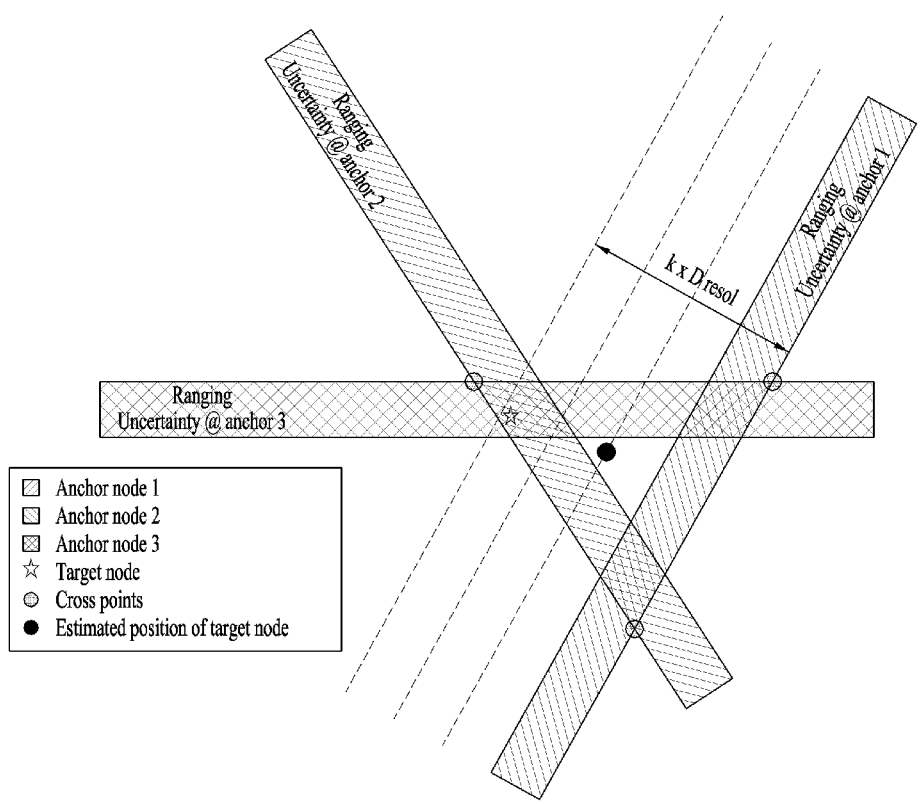
FIG. 4 is a diagram illustrating the case in which a target node does not all secure ideal links with anchor nodes according to an aspect of the present disclosure.

In an actual environment, a greater number of anchor nodes than in FIGS. 3 and 4 may be present. Therefore, for relaxation of a condition for securement of a sufficient SNR and an LoS environment with all anchor nodes, an intersection at which $N\_f$ ($3 \leq N\_f \leq N$) ranging uncertainty regions overlap may be defined as a full-intersection. $N\_f$ may be configured in a system and is reasonably operable when $N\_f$ has a value equal to or greater than 3 on a 2-dimensional geometry. However, the $N\_f$ value set to 3 or more is exemplary and does not limitedly interpret the right scope of the present disclosure.

In FIG. 4, the full-intersection is not present. In both FIG. 3 and FIG. 4, the target node obtains cross points of bold solid lines and then estimates a point obtained through a proper mathematical operation (e.g., least square operation) as the position thereof. A relatively small positioning error occurs in FIG. 3, whereas a considerable positioning error may occur as illustrated in FIG. 4.

Proposal 2 (Determination of Full-Intersection)

If an ideal link in which a sufficient SNR is secured and an LoS component is present between at least $N\_F$ anchor nodes and a specific target node is satisfied, there is no sampling error in propagation delay estimation of a first path. Then, the full-intersection may be present as illustrated in FIG. 3. In other words, $\varepsilon\_ij=k*D\_resol+\Delta\_ij=\Delta\_ij$ may be satisfied.

In contrast, when the full-intersection is not present as illustrated in FIG. 4, if propagation delay estimation of the first path is performed between N anchor nodes and a specific target node j, a measurement error may occur in (N−N_F+1) or more links in an environment in which the ideal link is not satisfied. This may mean a large ranging error ε_ij and, as a result, may be interpreted as causing a large positioning error ε_j.

That is, the target node j may sufficiently determine whether the full-intersection is present based on information of {X_1, . . . ,X_N}, {hat_D_1j, . . . , hat_D_Nj}, and D_resol. Therefore, upon determining that there is no full-intersection, the target node may estimate that very large ranging and positioning errors occur at a position estimated thereby.

Figure 5:
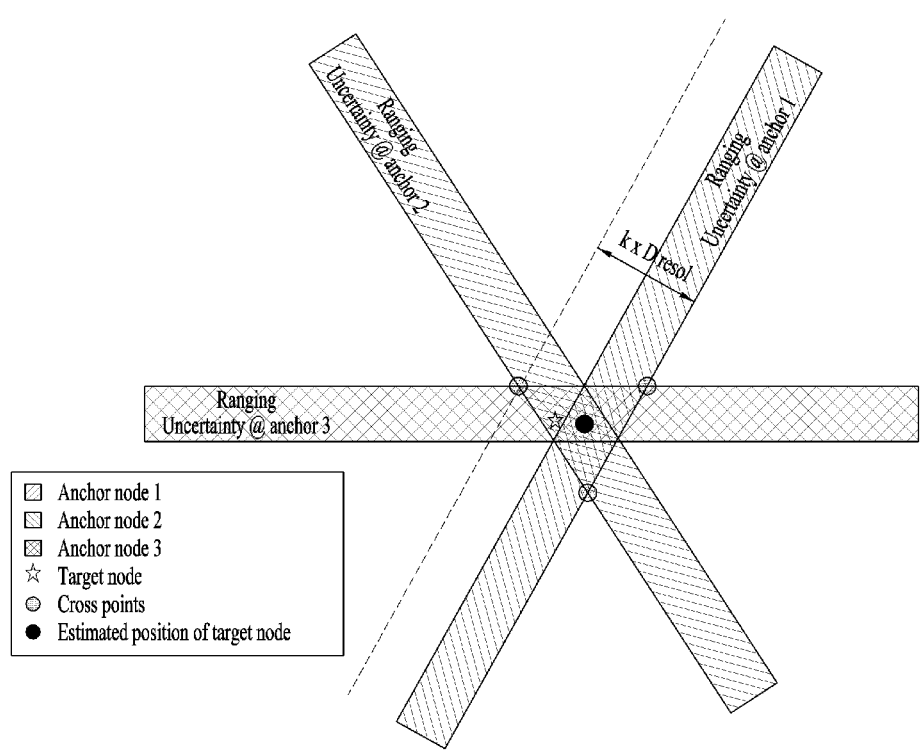
FIG. 5 is a diagram illustrating k=1 in ranging between an anchor node and a target node according to an aspect of the present disclosure.

FIG. 5 is a diagram illustrating k=1 in ranging between anchor node 1 and a target node of FIG. 3. As illustrated in FIG. 5, even when a full-intersection is present although a sampling error has actually occurred, a target node may estimate that a positioning error ε_j is small to some degree. That is, although the target node does not know whether there is a sampling error, the target node may estimate that the positioning error ε_j is small based on the fact that there is a full-intersection.

Proposal 3 (Determination of Temporal Anchor Node Depending on Whether Full-Intersection is Present)

According to an embodiment of the present disclosure, a method is proposed in which a target node estimates the degree of a positioning error thereof depending on whether a full-intersection is present, determines whether the target node is a temporal anchor node based on the estimated result, and broadcasts a message to neighboring nodes based on the determined result.

Figure 6:
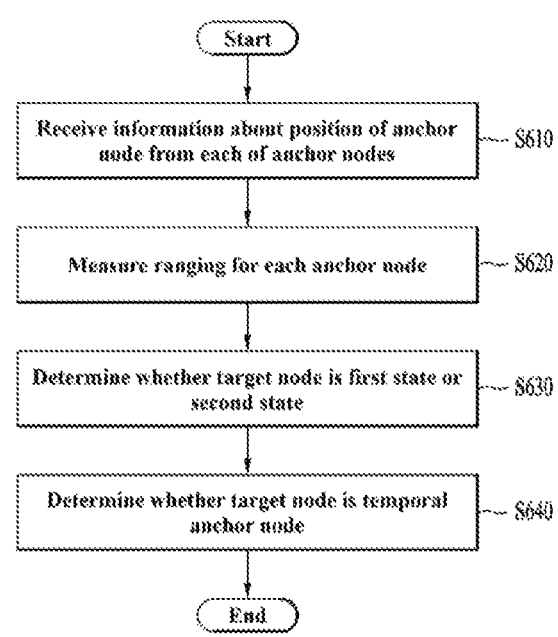
FIG. 6 is a flowchart illustrating determination of whether a target node is a temporal anchor node according to an aspect of the present disclosure.

First, a method of determining whether the target node is a temporal anchor node will now be described with reference to FIG. 6.

The target node may receive information about the position of an anchor node from each of anchor nodes that are aware of the position thereof (S610). Next, the target node may measure ranging for the anchor nodes (S620).

The target node may determine whether the target node is a first state or a second state based on information about the position of the anchor node, the ranging, and resolution information of the ranging (S630). Finally, the target node may determine whether the target node is the temporal anchor node based on the determination (S640).

The first state may be a state in which a region in which ranging regions for the target node and the anchor nodes commonly overlap is present. The second state may be state in which the region in which the ranging regions for the target node and the anchor nodes commonly overlap is not present.

Figure 7:
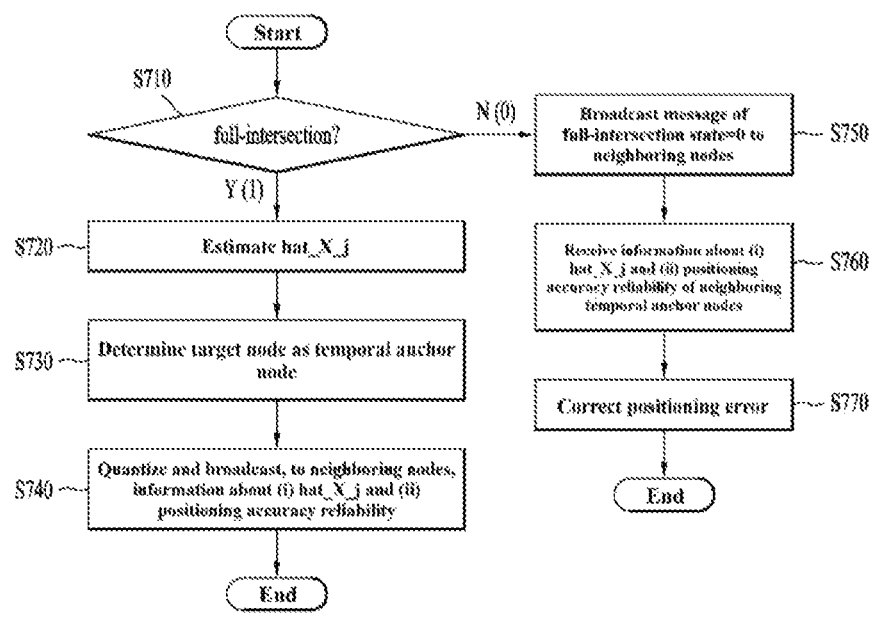
FIG. 7 is a flowchart illustrating detailed steps of FIG. 6.

Details of each step of FIG. 6 will now be described with reference to a flowchart of FIG. 7. First, a target node j receives information about actual positions {X_1, . . . ,X_N} of anchor nodes and assumes that information about ranging values {hat_D_1j, . . . , hat_D_Nj} with the anchor nodes has been measured. Since D_resol is a value determined in a system, the target node may be aware of information about D_resol.

In the first step, a target node j determines whether a full-intersection thereof is present (S710). For this determination, the target node j may determine whether a full-intersection thereof is present by drawing N ranging uncertainty regions using (i) {X_1, . . . ,X_N} received from anchor nodes as actual positions of the anchor nodes, (ii) {hat_D_ij, . . . , hat_D_Nj} measured thereby as ranging values with the anchor nodes, and (iii) D_resol determined in a system, known to the target node.

If the full-intersection is present, the target node may set the full-intersection to 1 and, if the full-intersection is not present, the target node may set the full-intersection state to 0.

In the second step, the target node j of full-intersection state=1 estimates the position hat_X_j thereof based on vertex coordinates of the full-intersection rather than cross points of solid lines through ranging (S720).

The target node j of full-intersection state=0 may broadcast a message of 'full-intersection state=0' to neighboring nodes (S750). More specifically, in the case of an inband sidelink, the target node j of full-intersection state=0 may transmit the message of 'full-intersection state=0' to an eNB together with an ID thereof. Thereafter, the target node j is scheduled with a proper idle resource by the eNB and then broadcasts the message of 'full-intersection state=0' to neighboring nodes through the corresponding resource.

Alternatively, in the case of an outband sidelink, the target node j broadcasts the message of 'full-intersection state=0' together with the ID thereof to neighboring nodes using a resource randomly selected from a resource pool for sidelink.

In the third step, the target node j of full-intersection state=1 recognizes (or determines) that itself is a temporal anchor node when (number of messages of 'full-intersection=0' received)/(area of full-intersection) as a metric reference exceeds a proper threshold (S730).

If the threshold value is small, although there is a loss in terms of signaling overhead and a resource contention probability, a network-level positioning error will be reduced. Extremely, if the threshold is 0, since there is no philosophy for positioning accuracy reliability, positioning will be similar to conventional distributed positioning (e.g., distributed weighted multidimensional scaling (dw-MDS)). Conversely, if the threshold value is very large, although signaling overhead and the resource contention probability are reduced, the network-level positioning error has a high probability of increasing relative to the case in which the threshold is small.

Next, if the target node j recognizes/determines that itself is the temporal anchor node, the target node j quantizes and broadcasts, to neighboring nodes, (i) information about the estimation position hat_Xj thereof and (ii) information about positioning accuracy reliability of the information about the estimation position hat_Xj (e.g., the area of the full-intersection or standard deviations of vertex coordinates of the full-intersection) (S740).

Even in this case, in the case of the inband sidelink, the target node j may use a resource allocated by the eNB and, in the case of the outband sidelink, the target node j may use a resource randomly selected from a resource pool for sidelink.

The specific target node of full-intersection state=0 that has received estimation position information and positioning accuracy reliability from a plurality of temporal anchor nodes may differentially interpret the received information and properly apply weighting upon correcting a positioning error thereof.

The target node j of full-intersection state=0 may receive information about estimation positions of neighboring temporal anchor nodes and information about positioning accuracy reliability of each estimation position from the neighboring temporal anchor nodes (S760).

The target node j of full-intersection state=0 may correct a positioning error thereof through additional ranging for the temporal anchor nodes based on the received information about the estimation position and the received information about positioning accuracy reliability of each estimation position (S770).

In correcting the positioning error of the target node according to an embodiment of the present disclosure, the following three weighting rules may be applied.

As the first rule, a higher priority may be given to a position of a temporal anchor node having a small ranging value with the target node. This may be understood based on ranging accuracy reliability. As the second rule, a higher priority may be given to a position of a temporal anchor node having a small area of a full-intersection or a small standard deviation of vertex coordinates of the full-intersection. This may be understood based on positioning accuracy reliability. As the third rule, a method of adjusting a priority by combining the first rule and the second rule may be applied.

Technical Effect and Contribution of the Present Disclosure Relative to Prior Art According to an aspect of the present disclosure, a network-level positioning error may be reduced as compared with a positioning scheme between multiple anchor nodes and a target node through time-based ranging in a physical environment in which a high SNR is not secured and an LoS is not guaranteed.

Since a link between target nodes is selected based on a full-intersection state, a signaling flow is less complex than a conventional distributed positioning algorithm in which all target nodes sequentially trigger ranging and positioning. Then, since positioning accuracy reliability is considered, better performance may be obtained in terms of error propagation.

Figure 8:
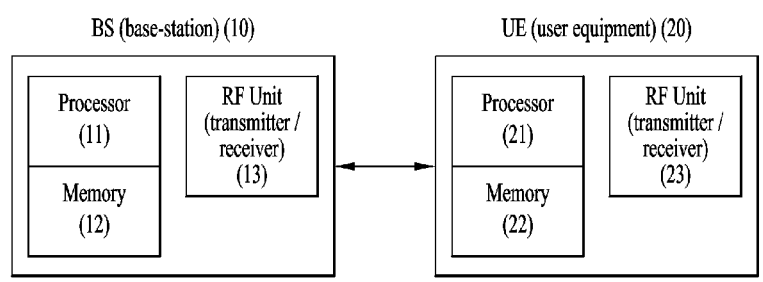
FIG. 8 is a diagram illustrating a system for implementing the present disclosure.

FIG. 8 is a diagram illustrating a system for implementing the present disclosure.

Referring to FIG. 8, a wireless communication system includes a BS 10 and one or more UEs 20. On downlink (DL), a transmitter may be a part of the BS 10 and a receiver may be a part of the UE 20. On uplink (UL), the BS 10 may include a processor 11, a memory 12, and a radio frequency (RF) unit 13 (transmitter and receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive radio signals.

The UE 20 may include a processor 21, a memory 22, and an RF unit 23 (transmitter and receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive radio signals.

The BS 10 and the UE 20 may include a single antenna and multiple antennas. If at least one of the BS 10 or the UE 20 includes multiple antennas, the wireless communication system may be called a multiple input multiple output (MIMO) system.

In the present specification, although the processor 21 of the UE and the processor 11 of the BS perform an operation of processing signals and data, except for a function of receiving or transmitting signals and a function of storing signals, the processors 11 and 21 will not be especially mentioned for convenience of description. Even though the processors 11 and 21 are not particularly mentioned, it may be said that the processors 11 and 21 perform operations of processing data except for a function of receiving or transmitting signals.

As a target node according to an aspect of the present disclosure, the UE 20 of FIG. 8 will now be described by way of example. However, the target node is not limitedly interpreted as the UE 20.

A method of reducing a wireless positioning error by the target node 20 according to an aspect of the present disclosure may include receiving, through the RF unit 23, information about the position of an anchor node from each of anchor nodes that are aware of the positions thereof, measuring ranging for the anchor nodes through the processor 21, determining, through the processor 21, whether the target node 20 is a first state or a second state based on the information about the position of the anchor node, the ranging, and resolution information of the ranging, and determining, through the processor 20, whether the target node 20 is a temporal anchor node based on the determination.

The first state may be a state in which a region in which ranging regions for the target node 20 and the anchor nodes commonly overlap is present. The second state may be state in which the region in which the ranging regions for the target node 20 and the anchor nodes commonly overlap is not present.

When the target node 20 is determined as the first state, the method of reducing the wireless positioning error by the target node 20 according to another aspect of the present disclosure may further include estimating the position of the target node 20 and determining, when a predetermined condition is satisfied, the target node 20 as the temporal anchor node through the processor 21, and transmitting information about the estimated position of the target node 20 to neighboring nodes except for the anchor nodes through the RF unit 23.

In the method of reducing the wireless positioning error by the target node 20 according to another aspect of the present disclosure, the predetermined condition may be satisfied when a value calculated based on (i) the number of messages indicating that the second state, received from the neighboring nodes through the RF unit, and (ii) an area of the region in which the ranging regions commonly overlap exceeds a preset threshold.

In the method of reducing the wireless positioning error by the target node 20 according to another aspect of the present disclosure, resolution of the ranging may be a value indicating the width of the ranging regions for the anchor nodes, configured by a system.

When the target node 20 is determined as the second state, the method of reducing the wireless positioning error by the target node 20 according to another aspect of the present disclosure may further include transmitting a message indicating that the target node 20 is the second state to the neighboring nodes except for the anchor nodes through the RF unit 23.

In the method of reducing the wireless positioning error by the target node 20 according to another aspect of the present disclosure, in an inband sidelink environment, the transmitting the message to the neighboring nodes except for the anchor nodes through the RF unit 23 may further include transmitting the message indicating the second message and an ID of the target node to the BS 10 through the RF unit 23, and transmitting the message to the neighboring nodes except for the anchor nodes through the RF unit 23 based on an idle resource scheduled by the BS 10.

In the method of reducing the wireless positioning error by the target node 20 according to another aspect of the present disclosure, in an outband sidelink environment, the transmitting the message to the neighboring nodes except for the anchor nodes through the RF unit 23 may further include transmitting the message and an ID of the target node 20 to the neighboring nodes except for the anchor nodes based on a resource selected from a sidelink resource pool.

The method of reducing the wireless positioning error by the target node 20 according to another aspect of the present disclosure may further include receiving information about positions of neighboring temporal anchor nodes from the temporal anchor nodes through the RF unit 23.

The method of reducing the wireless positioning error by the target node 20 according to another aspect of the present disclosure may further include performing additional ranging for each of the temporal anchor nodes through the processor 21, and correcting a positioning error of the target node 20 based on the additional ranging.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Mode for Disclosure

Various embodiments have been described in the best mode for carrying out the disclosure.

The above description is to be considered in all respects as illustrative and not restrictive. The scope of the disclosure should be determined by reasonable interpretation of the appended claims and all changes which come within the equivalent scope of the disclosure are included in the scope of the disclosure.

Industrial Applicability

The present disclosure is industrially applicable to various wireless communication systems such as 3GPP LTE/LTE-A, and 5G systems.

The invention claimed is:

1. A method of reducing a wireless positioning error by a target node in a multi-node system, the method comprising:
receiving information about a position of an anchor node from each of one or more anchor nodes;
performing ranging for the one or more anchor nodes;
measuring a position of the target node based on a first state of the target node; and
transmitting information about the measured position of the target node to one or more neighboring nodes excluding the one or more anchor nodes,
wherein, in the first state, a region in which ranging regions for the one or more anchor nodes commonly overlap is present, and
wherein the information about the measured position of the target node is transmitted based on a predetermined condition being satisfied, and the predetermined condition is satisfied when a value measured based on (i) the number of messages received from the one or more neighboring nodes and (ii) an area of the region in which the ranging regions commonly overlap exceeds a preset threshold.

2. The method of claim 1, wherein a state of the target node is determined based on the ranging, resolution information of the ranging, and information about the position of the anchor node.

3. The method of claim 2, wherein the resolution information relates to a width of the ranging regions of the one or more anchor nodes.

4. The method of claim 1, further comprising:
based on a second state of the target node, transmitting a message indicating that the target node is in the second state with respect to the one or more neighboring nodes excluding the one or more anchor nodes, wherein, in the second state, the region in which the ranging regions for the one or more anchor nodes commonly overlap is not present.

5. The method of claim 4, wherein transmitting the message to the one or more neighboring nodes excluding the one or more anchor nodes in an inband sidelink environment includes:
transmitting the message indicating that the target node is in the second state and an identification (ID) of the target node to a base station (BS); and
transmitting the message to the one or more neighboring nodes excluding the one or more anchor nodes based on an idle resource scheduled by the BS.

6. The method of claim 4, wherein transmitting the message to the one or more neighboring nodes excluding the anchor nodes in an outband sidelink environment includes:
transmitting the message and an identification (ID) of the target node to the one or more neighboring nodes excluding the one or more anchor nodes based on a resource selected from a sidelink resource pool.

7. The method of claim 4, further comprising receiving information about positions of neighboring temporal anchor nodes from the neighboring temporal anchor nodes.

8. The method of claim 7, further comprising:
performing additional ranging for each of the neighboring temporal anchor nodes; and
correcting a positioning error of the target node based on the additional ranging.

9. A target node for performing a method of reducing a wireless positioning error in a multi-node system, the target node comprising:
a transmitter and receiver configured to transmit and receive information about a position of an anchor node from each of one or more anchor nodes; and
a processor, wherein the processor:
performs ranging for the one or more anchor nodes,
measures a position of the target node based on a first state of the target node, and transmits information about the measured position of the target node to one or more neighboring nodes excluding the one or more anchor nodes, and wherein, in the first state, a region in which ranging regions for the one or more anchor nodes commonly overlap is present, and wherein the information about the measured position of the target node is transmitted based on a predetermined condition being satisfied, and the predetermined condition is satisfied when a value measured based on (i) the number of messages received from the one or more neighboring nodes and (ii) an area of the region in which the ranging regions commonly overlap exceeds a preset threshold.

10. The target node of claim 9, wherein a state of the target node is determined based on the ranging, resolution information of the ranging, and information about the position of the anchor node.

11. The target node of claim 10, wherein the resolution information relates to a width of the ranging regions of the one or more anchor nodes.

12. The target node of claim 9, wherein, based on a second state of the target node, the processor transmits a message indicating that the target node is in the second state with respect to the one or more neighboring nodes excluding the one or more anchor nodes through transmitter, and wherein, in the second state, the region in which the ranging regions for the one or more anchor nodes commonly overlap is not present.

13. The target node of claim 12, wherein the processor in an inband sidelink environment:

transmits the message indicating that the target node is in the second state and an identification (ID) of the target node to a base station (BS) through the transmitter; and transmits the message to the one or more neighboring nodes excluding the one or more anchor nodes through the transmitter based on an idle resource scheduled by the BS.

14. The target node of claim 12, wherein the processor in an outband sidelink environment transmits the message and an identification (ID) of the target node to the one or more neighboring nodes excluding the one or more anchor nodes through the transmitter based on a resource selected from a sidelink resource pool.

15. The target node of claim 12, wherein the processor receives information about positions of neighboring temporal anchor nodes from the neighboring temporal anchor nodes through the receiver.

16. The target node of claim 15, wherein the processor
performs additional ranging for each of the neighboring temporal anchor nodes, and correcting a positioning error of the target node based on the additional ranging.

17. The target node of claim 15, wherein the target node is capable of communicating with at least one of another target node, a target node related to an autonomous driving vehicle, a base station or a network.

* * * * *